US012614816B2

(12) United States Patent
Ka et al.

(10) Patent No.: US 12,614,816 B2
(45) Date of Patent: Apr. 28, 2026

(54) SEPARATOR FOR SECONDARY BATTERIES

(71) Applicant: LG ENERGY SOLUTION, LTD., Seoul (KR)

(72) Inventors: Kyung Ryun Ka, Daejeon (KR); In Hyouk Sung, Daejeon (KR); Ji Su Lee, Daejeon (KR); Dong Wook Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 562 days.

(21) Appl. No.: 18/021,746

(22) PCT Filed: Jun. 22, 2022

(86) PCT No.: PCT/KR2022/008882

§ 371 (c)(1),
(2) Date: Feb. 16, 2023

(87) PCT Pub. No.: WO2022/270908

PCT Pub. Date: Dec. 29, 2022

(65) Prior Publication Data

US 2024/0039123 A1 Feb. 1, 2024

(30) Foreign Application Priority Data

Jun. 25, 2021 (KR) ........................ 10-2021-0083162

(51) Int. Cl.
| | |
|---|---|
| *H01M 50/491* | (2021.01) |
| *H01M 50/107* | (2021.01) |
| *H01M 50/417* | (2021.01) |
| *H01M 50/431* | (2021.01) |
| *H01M 50/451* | (2021.01) |

(52) U.S. Cl.
CPC ....... *H01M 50/491* (2021.01); *H01M 50/107* (2021.01); *H01M 50/417* (2021.01); *H01M 50/431* (2021.01); *H01M 50/451* (2021.01)

(58) Field of Classification Search
CPC ............. H01M 50/491; H01M 50/107; H01M 50/417; H01M 50/431; H01M 50/451; H01M 2220/20; H01M 50/489; H01M 10/0587; Y02E 60/10
See application file for complete search history.

(56) References Cited

U.S. PATENT DOCUMENTS

| | | | |
|---|---|---|---|
| 2010/0196751 A1 | 8/2010 | Kobayashi | |
| 2010/0279173 A1* | 11/2010 | Hying ................. | H01M 50/434 |
| | | | 427/126.3 |
| 2011/0143185 A1 | 6/2011 | Nishikawa | |
| 2012/0034509 A1 | 2/2012 | Bae et al. | |
| 2012/0301698 A1* | 11/2012 | Rhee ................... | H01M 50/417 |
| | | | 428/220 |
| 2013/0236767 A1 | 9/2013 | Nishikawa et al. | |

| | | | |
|---|---|---|---|
| 2013/0260208 A1 | 10/2013 | Cho et al. | |
| 2015/0132632 A1* | 5/2015 | Hwang ............... | H01M 50/451 |
| | | | 264/465 |
| 2015/0263325 A1 | 9/2015 | Honda et al. | |
| 2015/0357619 A1 | 12/2015 | Bae et al. | |
| 2016/0204406 A1 | 7/2016 | Ryu et al. | |
| 2017/0054122 A1 | 2/2017 | Egawa et al. | |
| 2017/0155119 A1* | 6/2017 | Suzuki ............... | H01M 50/417 |
| 2018/0166672 A1 | 6/2018 | Honda et al. | |
| 2018/0277814 A1 | 9/2018 | Egawa et al. | |
| 2019/0051879 A1 | 2/2019 | Lee et al. | |
| 2019/0198840 A1* | 6/2019 | Huang ............... | H01M 50/426 |
| 2019/0207191 A1 | 7/2019 | Huang et al. | |
| 2020/0006733 A1* | 1/2020 | Cho .................... | H01M 50/489 |
| 2020/0058916 A1 | 2/2020 | Schmitz et al. | |
| 2020/0343509 A1* | 10/2020 | Lee .................... | H01M 50/434 |
| 2021/0050577 A1 | 2/2021 | Ka et al. | |
| 2021/0074984 A1 | 3/2021 | Lee et al. | |
| 2021/0210818 A1 | 7/2021 | Park et al. | |
| 2022/0416361 A1 | 12/2022 | Ka et al. | |
| 2024/0243432 A1 | 7/2024 | Park et al. | |

FOREIGN PATENT DOCUMENTS

| | | | |
|---|---|---|---|
| CN | 102742045 A | 10/2012 | |
| CN | 111512473 A | 8/2020 | |
| CN | 111902966 A | 11/2020 | |
| EP | 2 333 876 A2 | 6/2011 | |
| EP | 3 506 393 A1 | 7/2019 | |
| EP | 3 800 699 A1 | 4/2021 | |
| JP | 2012-114075 A | 6/2012 | |
| JP | 2016-13623 A | 1/2016 | |
| KR | 10-2011-0050517 A | 5/2011 | |
| KR | 10-2011-0087017 A | 8/2011 | |
| KR | 10-2013-0048177 A | 5/2013 | |
| KR | 10-1312431 B1 | 9/2013 | |
| KR | 10-2015-0068711 A | 6/2015 | |
| KR | 10-2015-0108040 A | 9/2015 | |
| KR | 10-1666045 B1 | 10/2016 | |
| KR | 10-2017-0037556 A | 4/2017 | |
| KR | 20170037556 A * | 4/2017 | ......... H01M 2/1653 |

(Continued)

OTHER PUBLICATIONS

International Search Report for PCT/KR2022/008882 mailed on Oct. 6, 2022.

(Continued)

*Primary Examiner* — Muhammad S Siddiquee

(74) *Attorney, Agent, or Firm* — Birch, Stewart, Kolasch & Birch, LLP

(57) ABSTRACT

A separator including a separator substrate including a porous material and an inorganic layer on at least one surface of the separator substrate. Each of the separator substrate and the inorganic layer has porosity related to permeability of the separator: (10×porosity of separator substrate)−(4×porosity of inorganic layer)≤permeability of separator.

8 Claims, 7 Drawing Sheets

(56)         References Cited

FOREIGN PATENT DOCUMENTS

| | | | |
|---|---|---|---|
| KR | 10-1730574 | B1 | 5/2017 |
| KR | 10-1913990 | B1 | 10/2018 |
| KR | 10-2019-0033028 | A | 3/2019 |
| KR | 10-2021-0031080 | A | 3/2021 |
| WO | WO 2009/014070 | A1 | 1/2009 |
| WO | WO 2010/021248 | A1 | 2/2010 |
| WO | WO 2013/080867 | A1 | 6/2013 |
| WO | WO 2014/083988 | A1 | 6/2014 |
| WO | WO 2015/178351 | A1 | 11/2015 |

OTHER PUBLICATIONS

Extended European Search Report for European Application No. 22828755.3, dated Sep. 3, 2024.

* cited by examiner

【FIG. 1】
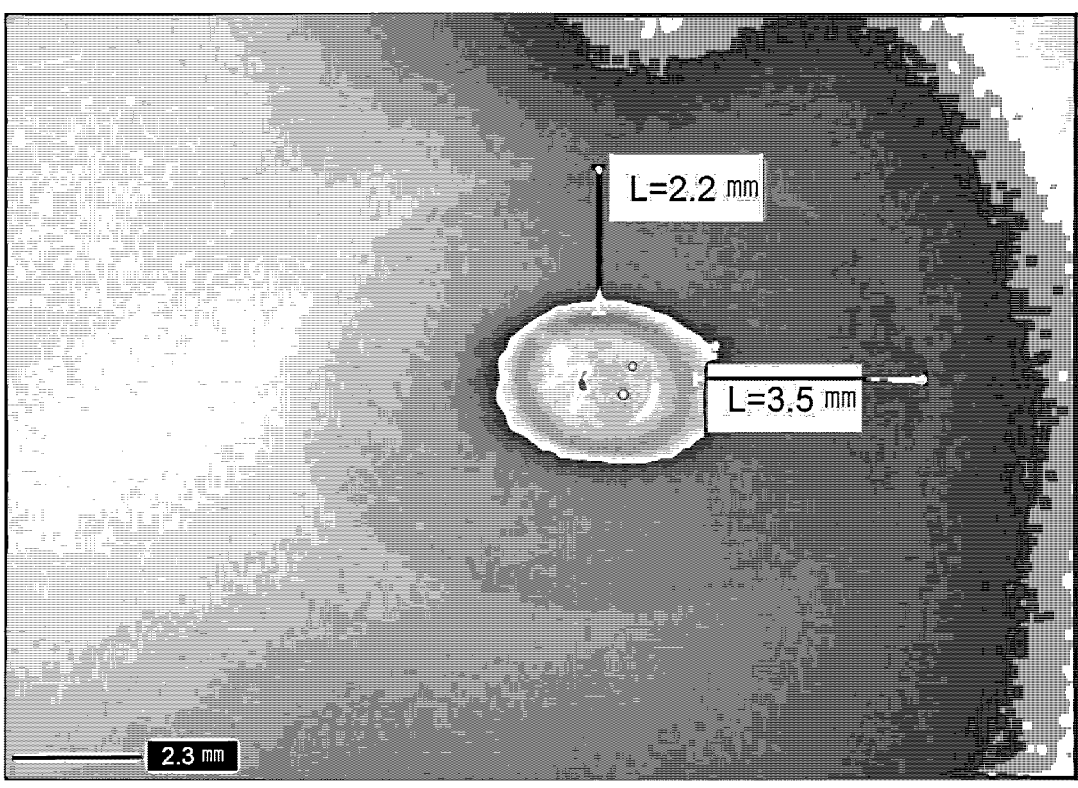
【FIG. 2】
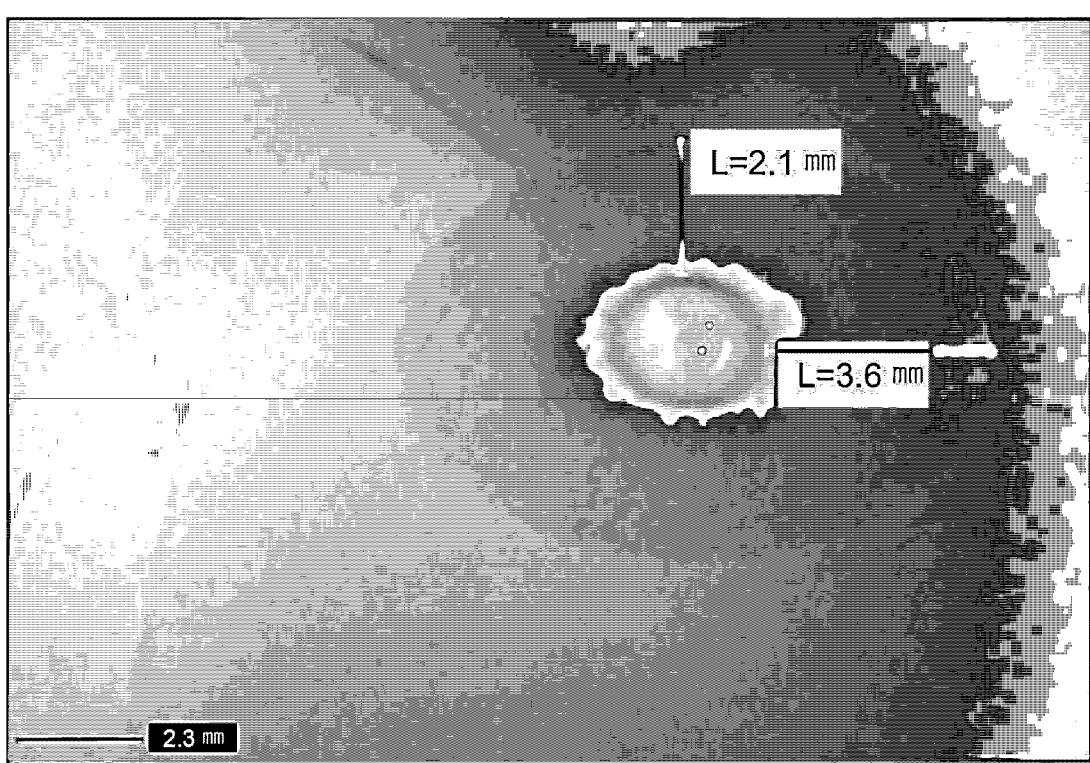

【FIG. 3】
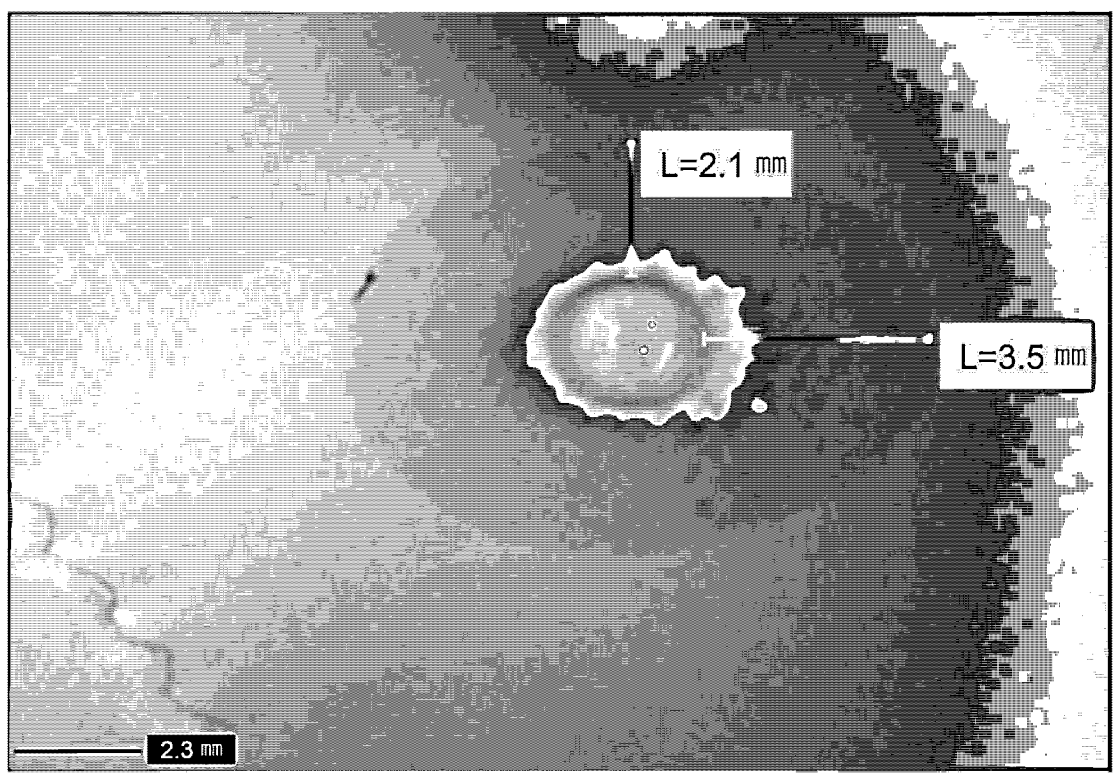
【FIG. 4】
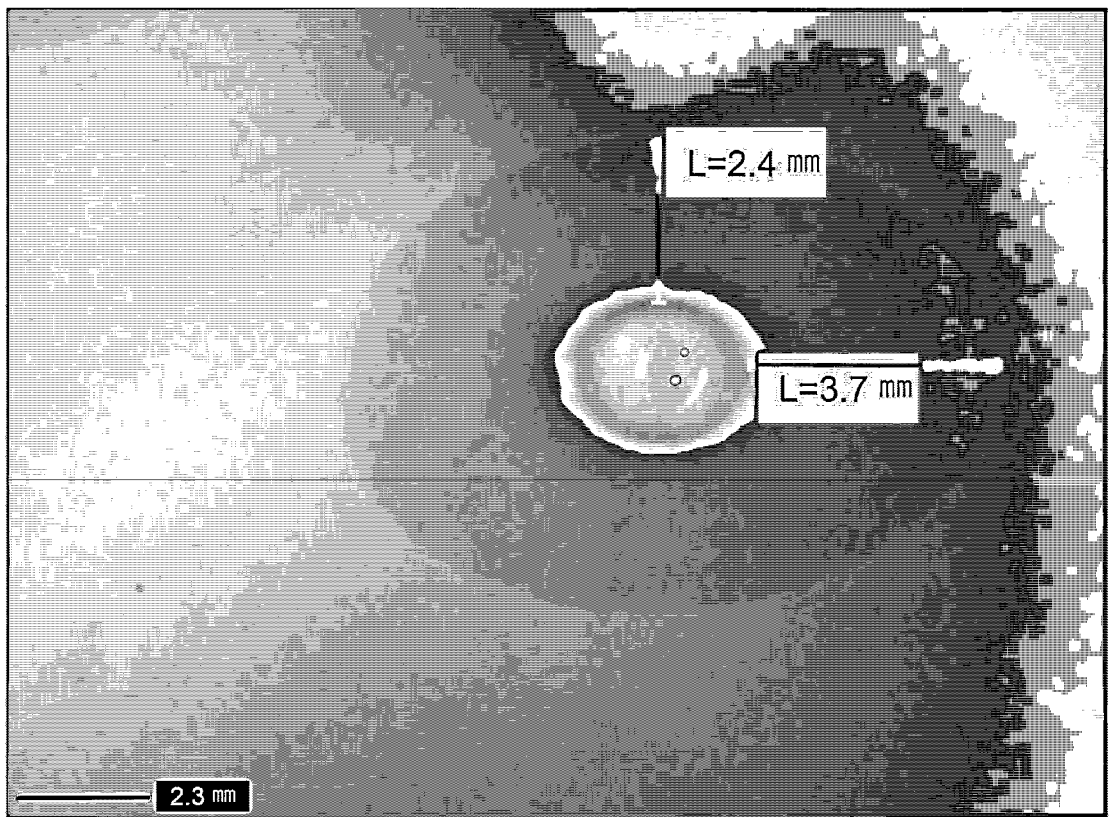

【FIG. 5】
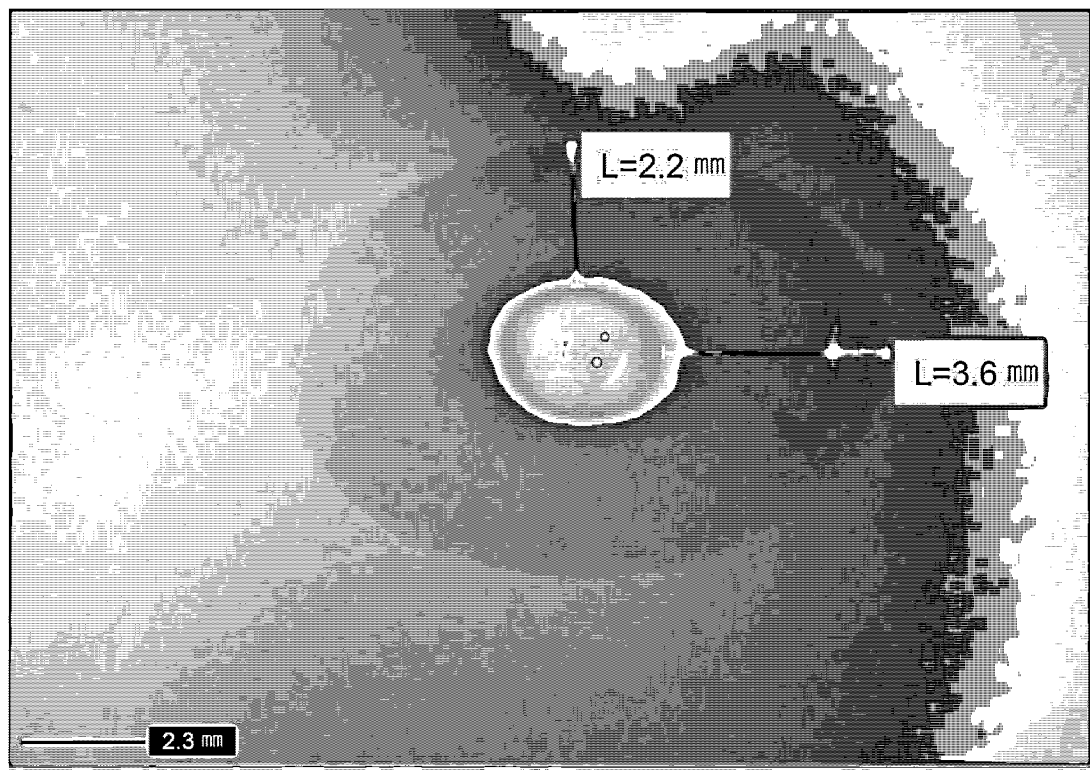
【FIG. 6】
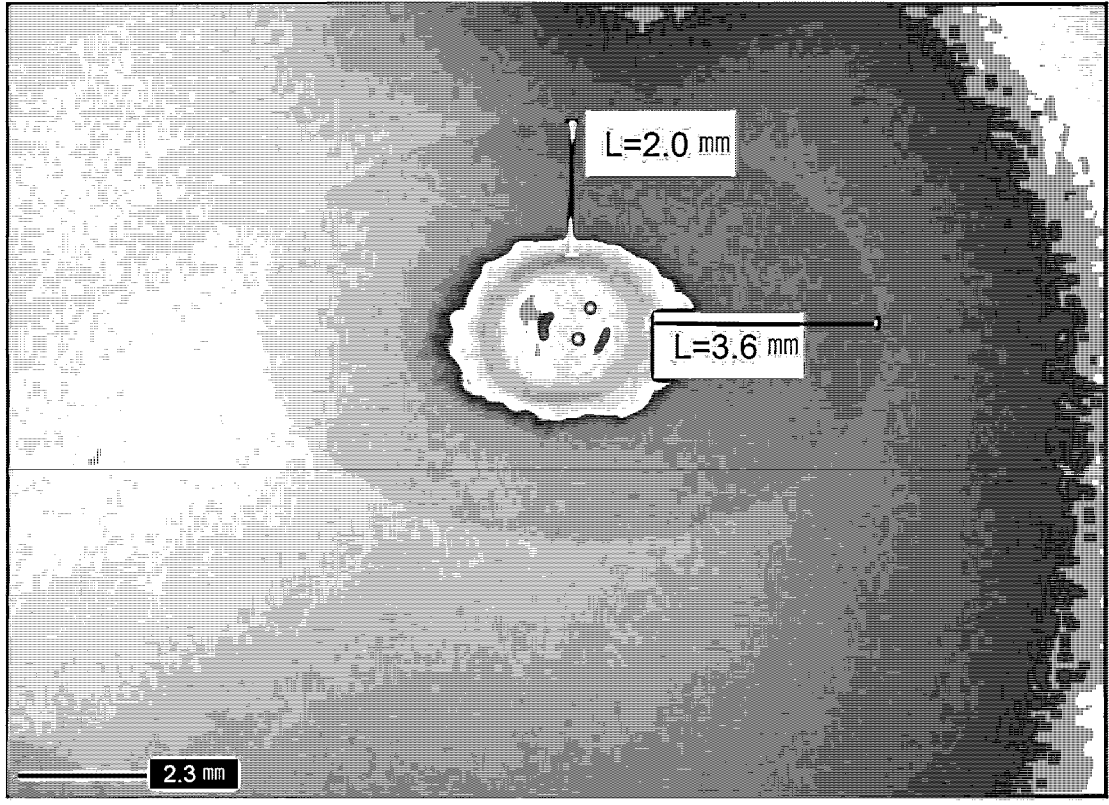

【FIG. 7】
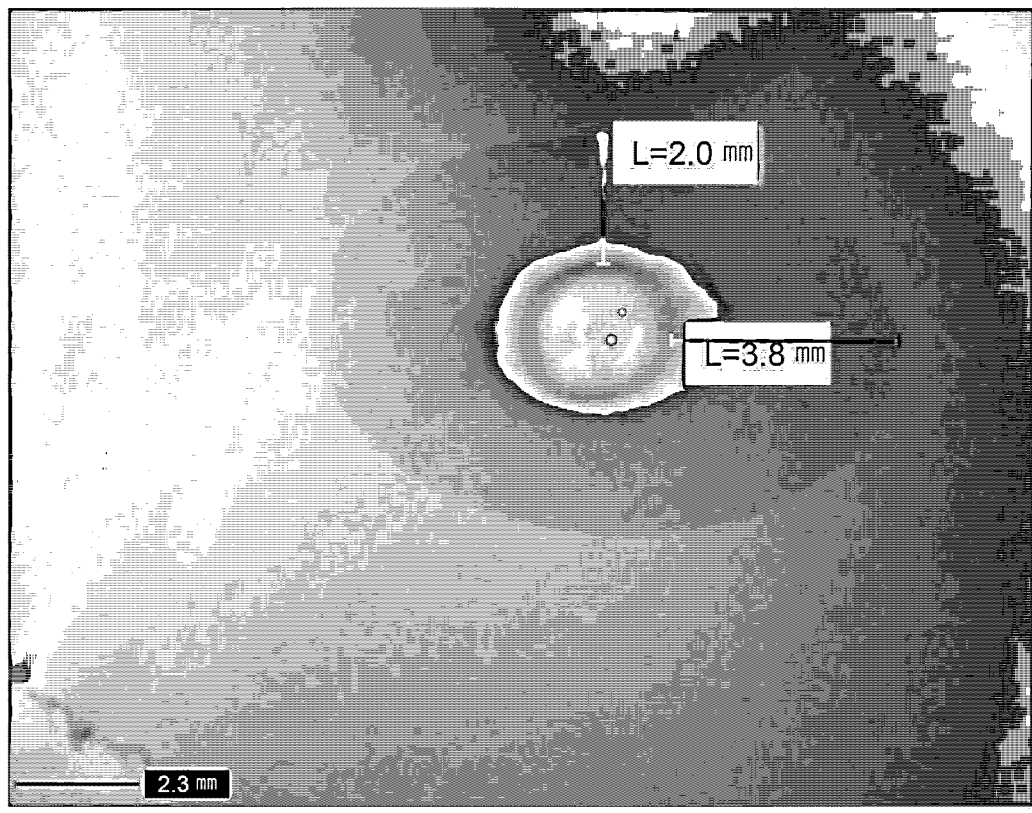
【FIG. 8】
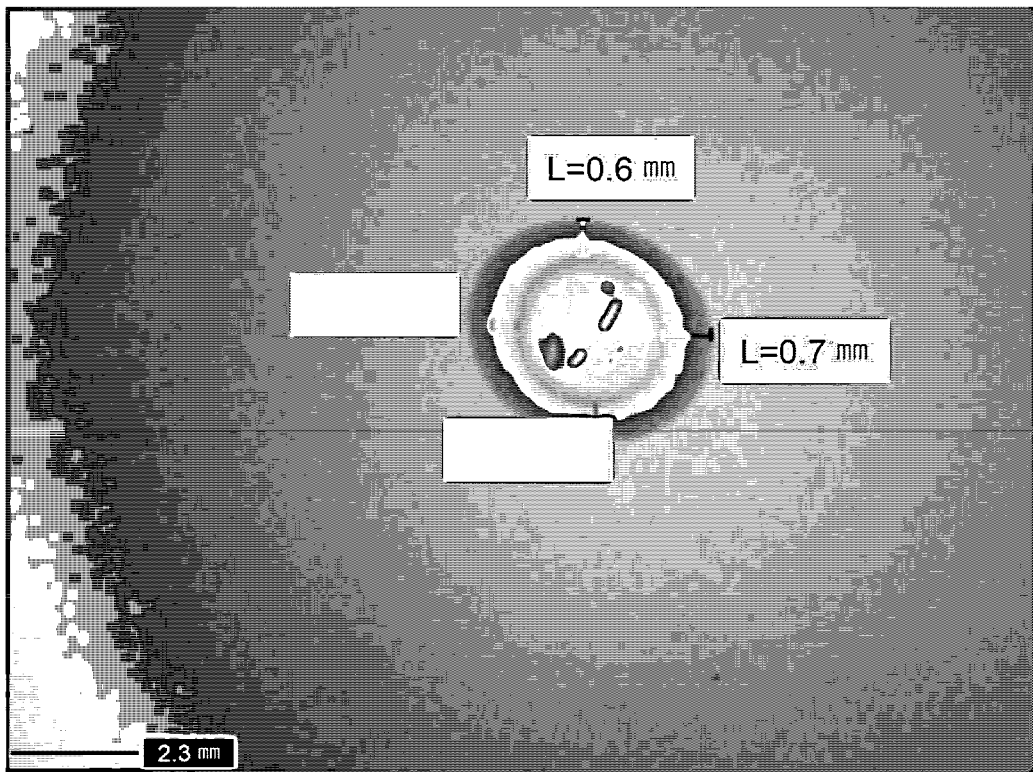

【FIG. 9】
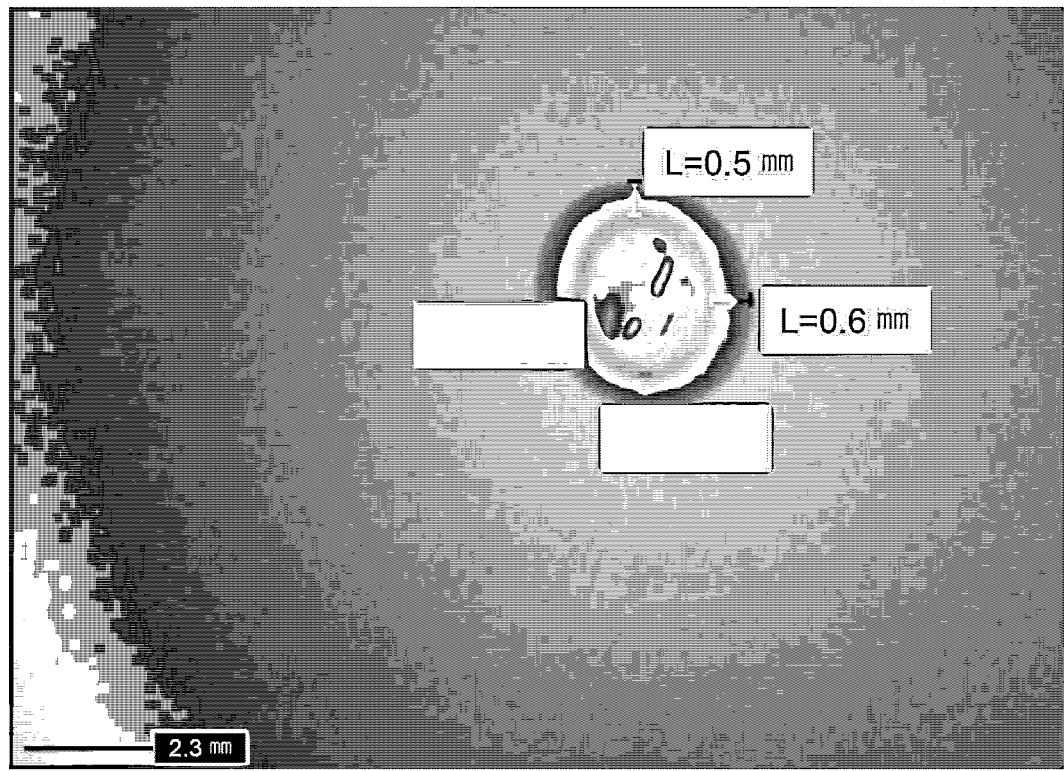
【FIG. 10】
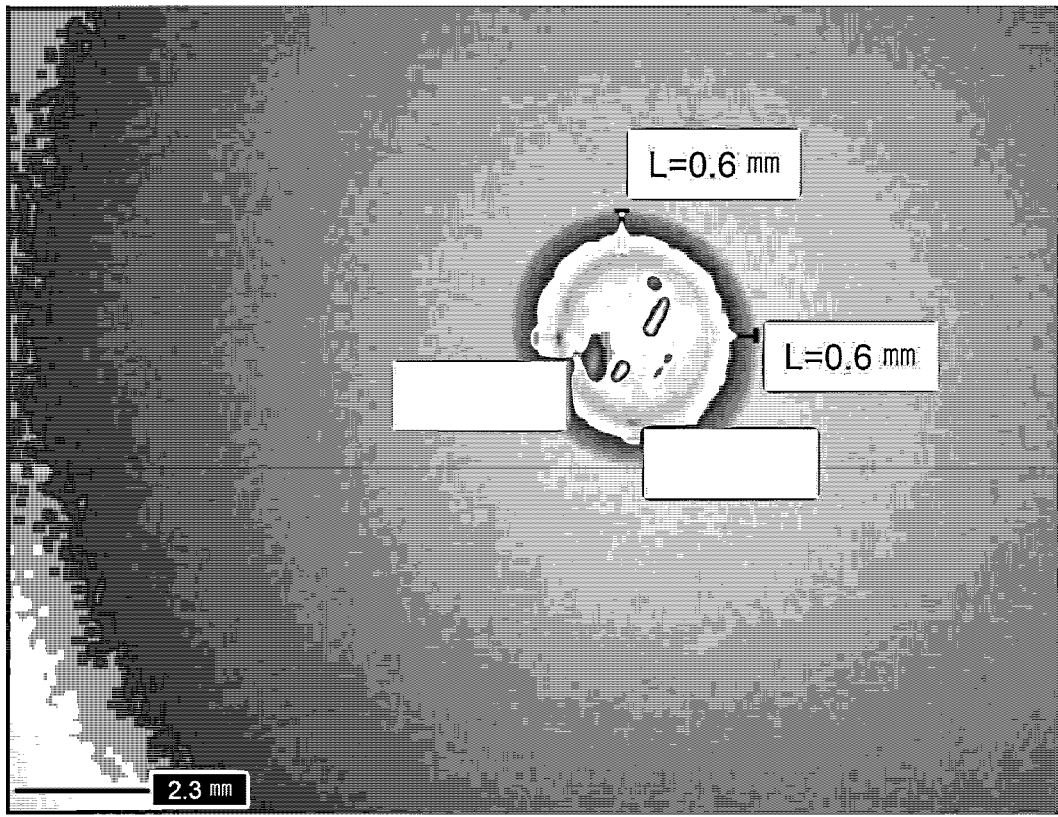

【FIG. 11】
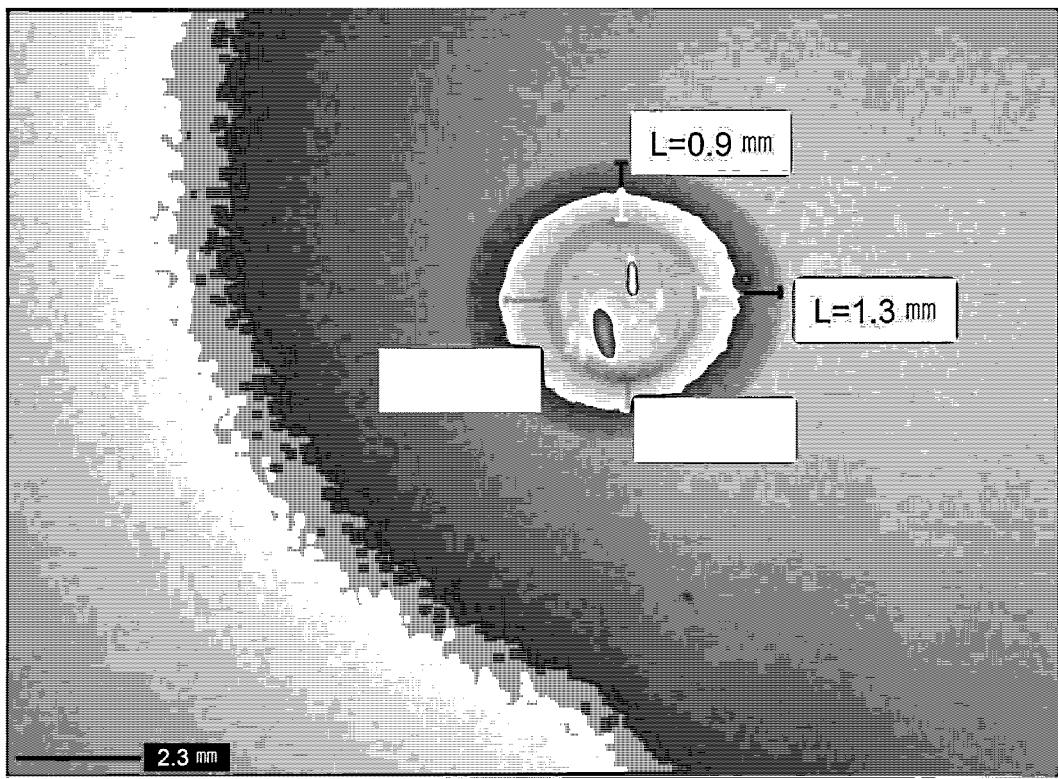
【FIG. 12】
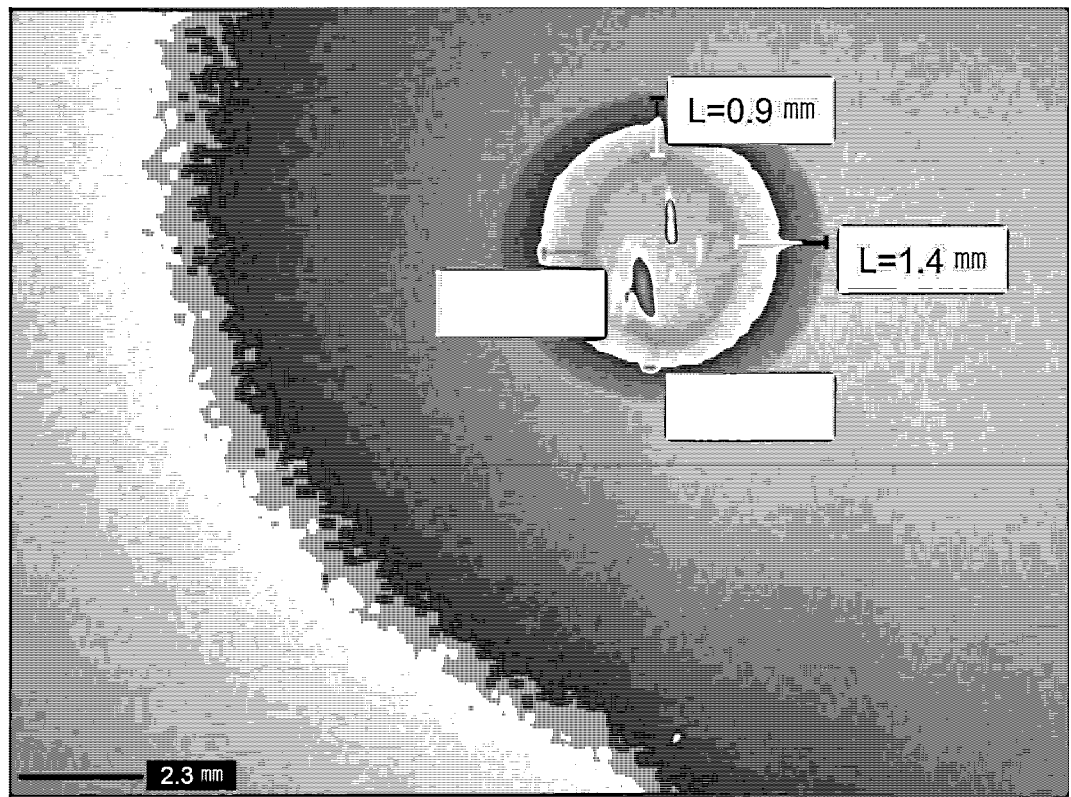

【FIG. 13】
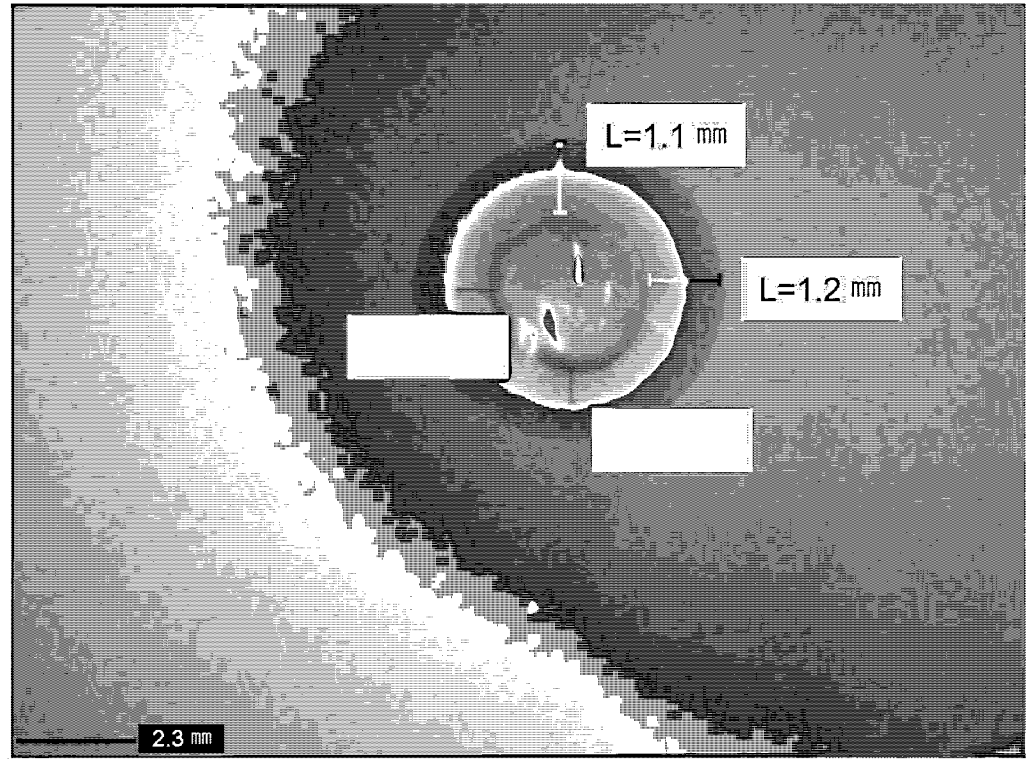
【FIG. 14】
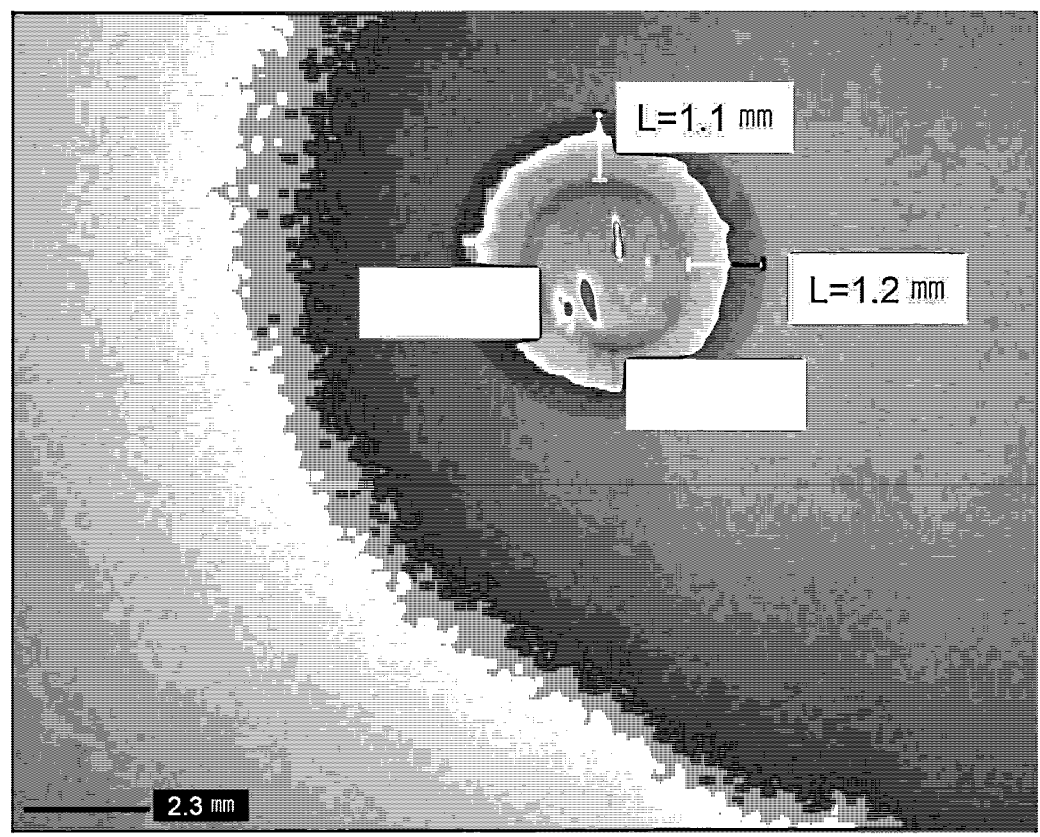

SEPARATOR FOR SECONDARY BATTERIES

TECHNICAL FIELD

This application claims the benefit of priority to Korean Patent Application No. 2021-0083162 filed on Jun. 25, 2021, the disclosure of which is incorporated herein by reference in its entirety.

The present invention relates to a separator for secondary batteries. More particularly, the present invention relates to a separator for secondary batteries configured such that porosity of each of a separator substrate and an inorganic layer constituting the separator is adjusted, whereby impregnability of the separator is adjusted.

BACKGROUND ART

A lithium secondary battery may be manufactured by receiving, in a battery case, an electrode assembly configured such that a separator is interposed between a positive electrode and a negative electrode, injecting an electrolytic solution into the battery case, and hermetically sealing the battery case.

The separator, which blocks electrical connection between the positive electrode and the negative electrode to secure insulation, may be configured to have a structure in which a coating layer including an inorganic material and a binder is formed on a polyolefin-based substrate made of a porous material such that lithium ions can move. The polyolefin-based material has low resistance to heat. For this reason, the coating layer may be added, whereby high-temperature safety and mechanical characteristics of the separator may be improved.

The coating layer including the inorganic material and the binder is configured to have a pore structure such that a space, into which a liquid electrolytic solution is introduced, is increased, whereby impregnability with the electrolytic solution and lithium ion conductivity are improved.

In the lithium secondary battery, the electrolytic solution is a movement path of lithium ions and therefore improving impregnability of the separator with the electrolytic solution to lower resistance of the separator is very important.

In particular, as the utilization field of the lithium secondary battery expands to a device requiring high voltage and high capacity, the size of a battery cell tends to be increased. Therefore, there is a need to develop a separator having improved impregnability with an electrolytic solution as a separator applicable to a battery cell having an increasing volume.

In connection therewith, Patent Document 1 relates to an inorganic oxide powder used to form an inorganic oxide porous film having excellent heat resistance, insulation, and film strength even in small apparent weight and having porosity necessary to impart sufficient ion permeability, wherein the inorganic oxide powder is added to a surface of at least one of a positive electrode, a negative electrode, and a separator.

That is, in Patent Document 1, an inorganic oxide powder having characteristics capable of improving ion permeability is used, whereby physical properties of the separator are improved.

Patent Document 2 relates to a separator including a porous polymer film and a porous coating layer formed on the porous polymer film, wherein surface fibrils of the porous polymer film and particles included in the porous coating layer are entangled at the interface between the porous polymer film and the porous coating layer. Since the particles included in the porous coating layer are entangled among fibrils formed on the surface of the porous polymer film before binding, as described above, the force of binding between the porous polymer film and the porous coating layer is further increased.

In Patent Document 2, the temperature at which a porous polyolefin film is coated with a slurry and the slurry is thermally fixed thereto is higher than a conventional thermal fixation temperature, whereby a separator having reduced heat shrinkage and improved permeability is provided.

In general, for a separator including a separator substrate having a porous structure and a coating layer having a porous structure, porosity of the separator substrate and porosity of the coating layer are relevant to impregnability of the separator.

In order to improve physical properties of the separator, a specific inorganic oxide powder is added in Patent Document 1, and thermal fixation is performed at a high temperature in Patent Document 2.

However, a method capable of securing impregnability of a separator to a predetermined level or higher using a conventional separator manufacturing method without execution of an additional process or introduction of an additional material or capable of indirectly checking whether impregnability of the separator is poor has not yet been proposed.

PRIOR ART DOCUMENTS (Patent Document 1) Korean Registered Patent Publication No. 1913990 (2018 Oct. 31)
(Patent Document 2) Korean Registered Patent Publication No. 1666045 (2016 Oct. 13)

DISCLOSURE

Technical Problem

The present invention has been made in view of the above problems, and it is an object of the present invention to provide a separator for secondary batteries configured such that porosity of a separator substrate and porosity of an inorganic layer are adjusted, whereby impregnability of the separator is improved.

Technical Solution

A separator according to the present invention to accomplish the above object includes a separator substrate including a porous material and an inorganic layer on at least one surface of the separator substrate, wherein each of the separator substrate and the inorganic layer has porosity related to permeability of the separator:

$$(10 \times \text{porosity of separator substrate}) - (4 \times \text{porosity of inorganic layer}) \leq \text{permeability of separator}$$

The porosity of the inorganic layer may be 55% or more.
The permeability of the separator may be 200 sec/100 cc or less.
The inorganic layer may have a thickness equivalent to 30% or more of the total thickness of the separator.
The inorganic layer may include inorganic material particles having a BET of 3.0 $m^2$/g or more.
The inorganic material particles may have a permittivity constant of 1 or more, piezoelectricity, or lithium ion transfer ability.

Each of a machine direction (MD) and a transverse direction (TD) diffusion distances of the separator may be 2.0 mm or more.

The present invention provides a cylindrical secondary battery having an electrode assembly including the separator received in a cylindrical battery case.

In addition, the present invention provides a battery pack including the cylindrical secondary battery as a unit cell, wherein the battery pack is used as an energy source of an electric vehicle, a hybrid electric vehicle, a plug-in hybrid electric vehicle, or a power storage device.

In addition, the present invention may provide various combinations of the above solving means.

Advantageous Effects

As is apparent from the above description, in a separator according to the present invention, porosity of a separator substrate and porosity of an inorganic layer may be adjusted, whereby it is possible to adjust impregnability of the separator with an electrolytic solution.

In addition, permeability of the separator may be measured, whereby it is possible to indirectly check whether impregnability of the separator with the electrolytic solution is poor.

In addition, it is possible to provide a separator having improved impregnability using a conventional separator manufacturing method without execution of an additional process or introduction of an additional material, and it is possible to apply the separator to a large-volume cylindrical secondary battery so as to be used in a device requiring high capacity and quick charging, such as an electric vehicle.

DESCRIPTION OF DRAWINGS

FIG. 1 is a drip test photograph of a separator according to Example 1.

FIG. 2 is a drip test photograph of a separator according to Example 2.

FIG. 3 is a drip test photograph of a separator according to Example 3.

FIG. 4 is a drip test photograph of a separator according to Example 4.

FIG. 5 is a drip test photograph of a separator according to Example 5.

FIG. 6 is a drip test photograph of a separator according to Example 6.

FIG. 7 is a drip test photograph of a separator according to Example 7.

FIG. 8 is a drip test photograph of a separator according to Comparative Example 1.

FIG. 9 is a drip test photograph of a separator according to Comparative Example 2.

FIG. 10 is a drip test photograph of a separator according to Comparative Example 3.

FIG. 11 is a drip test photograph of a separator according to Comparative Example 4.

FIG. 12 is a drip test photograph of a separator according to Comparative Example 5.

FIG. 13 is a drip test photograph of a separator according to Comparative Example 6.

FIG. 14 is a drip test photograph of a separator according to Comparative Example 7.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

A separator according to the present invention may include a separator substrate made of a porous material and an inorganic layer formed on at least one surface of the separator substrate by coating, wherein porosity of the separator substrate and porosity of the inorganic layer may satisfy the following relation to permeability of the separator.

$$(10 \times \text{porosity of separator substrate}) - (4 \times \text{porosity of inorganic layer}) \leq \text{permeability of separator}$$

The separator substrate may include a polyolefin-based polymer resin commonly used in the art to which the present invention pertains, and may be made of, for example, at least one selected from the group consisting of high-density polyethylene, low-density polyethylene, linear low-density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfidresulfide, polyethylene naphthalene, and a mixture thereof.

In general, when only the separator substrate including the polyolefin-based polymer resin is used as the separator, not only is heat resistance of the separator low but also mechanical strength of the separator is low. In order to solve these problems, an inorganic layer including an inorganic material and a binder is provided on one surface or opposite surfaces of the separator substrate.

A material having a permittivity constant of 1 or more, piezoelectricity, or lithium ion transfer ability may be used as the inorganic material constituting the inorganic layer.

Specifically, a non-limiting example of the inorganic material having a permittivity constant of 1 or more is $SrTiO_3$, $SnO_2$, $CeO_2$, MgO, NiO, CaO, ZnO, $ZrO_2$, $Y_2O_3$, $Al_2O_3$, $TiO_2$, SiC, boehmite, alumina trihydrate (ATH), or a mixture thereof.

The inorganic material having piezoelectricity is a material configured such that a potential difference is formed due to a positive charge and a negative charge generated between opposite surfaces of a particle when a predetermined pressure is applied thereto, and a non-limiting example thereof may be at least one selected from the group consisting of $BaTiO_3$, Pb(Zr, Ti)$O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), and a mixture thereof.

The inorganic material having lithium ion transfer ability, which contains a lithium element but moves lithium ions without storage of lithium, may be at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, $P_2S_5$-based glass ($Li_xP_yS_z$, $0<x<3$, $0<y<3$, $0<z<7$), such as $LiI$—$Li_2S$—$P_2S_5$, and a mixture thereof.

The inorganic material constituting the inorganic layer may be made of a particle having a BET of 3.0 m$^2$/g or more.

If the BET of the inorganic material is less than 3.0 m$^2$/g, impregnability is lowered, which is undesirable.

The kind of the binder is not particularly restricted as long as the binder does not chemically change the inorganic layer of the separator. For example, the binder may be made of polyolefin, such as polyethylene or polypropylene; a fluorine-containing resin, such as polyvinylidene fluoride or polytetrafluoroethylene; a fluorine-containing copolymer, such as a vinylidene fluoride-hexafluoropropylene-tetrafluoroethylene copolymer or an ethylene-tetrafluoroethylene copolymer; a styrene-butadiene copolymer or a hydride thereof; a (meth)acrylic acid ester copolymer, such as a methacrylic acid ester copolymer, an acrylonitrile acrylic acid ester copolymer, or a styrene acrylic acid ester copolymer; rubber, such as ethylene propylene rubber; polyvinyl acetate; a resin having a melting point or a glass transition temperature of 180° C. or higher, such as polyphenylene ether, polysulfone, polyethersulfone, polyphenylene sulfide, polyetherimide, polyamide, polyimide, polyamide imide, polyetheramide, polyester, aromatic polyester, or polyetheretherketone; polycarbonate; polyacetal; a water soluble resin, such as carboxyalkyl cellulose, alkyl cellulose, hydroxyalkyl cellulose, starch, polyvinyl alcohol, sodium alginate, polyethylene glycol, cellulose ester, polyacrylic acid, polyacrylic amide, or polymethacrylic acid; a (meth) acrylic-based resin; or a copolymer including two or more thereof.

The inorganic layer may further include a dispersant. For example, the dispersant may be an acrylic-based copolymer, cyanoethyl polyvinyl alcohol, polyvinyl pyrrolidone, baicalin, luteolin, taxifolin, myricetin, quercetin, rutin, catechin, epigallocatechin gallate, butein, piceatannol, a phenol-based compound including tannic acid, pyrogallic acid, amylose, amylopectin, xanthan gum, a fatty acid-based compound, or a polymer compound of two or more thereof.

In general, when impregnability of the separator substrate and impregnability of the inorganic layer are compared with each other, porosity of the separator substrate may tend to be less than porosity of the inorganic layer in consideration of the fact that the impregnability of the inorganic layer is higher than the impregnability of the separator substrate.

In addition, when each of the porosity of the separator substrate and the porosity of the inorganic layer is equal to or greater than a certain extent, the impregnability of the separator substrate may be increased. In the separator according to the present invention, when the porosity of the separator substrate and the porosity of the inorganic layer have the above relation, a determination may be made that the impregnability of the separator substrate is excellent if permeation time of the separator satisfies a condition of 200 sec/100 cc or less.

That is, when simply comparing the result calculated by applying the value of the porosity of the separator substrate and the value of the porosity of the inorganic layer according to the above relation with the value of the permeability of the separator without consideration of the units of porosity and permeability, a determination may be made that the impregnability of the separator substrate is excellent if the above relation is satisfied.

In a concrete example, the porosity of the inorganic layer may be 55% or more, and the porosity of the separator substrate may be adjusted such that the permeability of the separator is 200 sec/100 cc or less within the range in which the porosity of the inorganic layer is satisfied.

The porosity of the inorganic layer may be adjusted depending on the content ratio of the inorganic material to the binder, wherein the content of the inorganic material in the inorganic layer may be 10 weight % to 90 weight % based on 100 weight % of a mixture including the inorganic material and the binder.

Meanwhile, the thickness of the inorganic layer may be 30% or more of the total thickness of the separator. For example, when the inorganic layer is formed only on one surface of the separator substrate, the thickness of the inorganic layer formed only on the one surface of the separator substrate may be 30% or more of the total thickness of the separator. Alternatively, when inorganic layers are formed on opposite surfaces of the separator substrate, the sum of the thicknesses of the inorganic layers formed on the opposite surfaces of the separator substrate may be 30% or more of the total thickness of the separator. Specifically, the thickness of the inorganic layer formed only on the one surface of the separator substrate or the sum of the thicknesses of the inorganic layers formed on the opposite surfaces of the separator substrate may be 50% or more, more specifically 70% or more, of the total thickness of the separator.

For a separator that satisfies the above relation, each of MD-direction and TD-direction diffusion distances may be 2.0 mm or more. Specifically, the MD-direction diffusion distance may be 3.0 mm or more, more specifically 3.5 mm or more. For a separator that does not satisfy the above relation, each of MD-direction and TD-direction diffusion distances is less than 2.0 mm. That is, it can be seen that the impregnability of the separator according to the present invention is remarkably improved.

The MD direction is a direction corresponding to an advance direction of a separator sheet at the time of manufacture of a separator, and the TD direction is a direction perpendicular to the MD direction.

The present invention provides a cylindrical secondary battery having an electrode assembly including the separator received in a cylindrical battery case.

The electrode assembly may be a jelly-roll type electrode assembly, configured to have a structure in which a positive electrode sheet and a negative electrode sheet are wound in the state in which a long separator sheet is disposed between the positive electrode sheet and the negative electrode sheet and is added to an outer surface of any one of the positive electrode sheet and the negative electrode sheet.

Alternatively, when an electrode assembly for cylindrical secondary batteries is manufactured, a single-sided coated separator having an inorganic layer formed only on one surface of a separator substrate may be used, whereby the capacity and energy density of the battery may be increased, since the safety security requirements are relatively low due to characteristics of the cylindrical secondary battery.

Conventional products may be used without limitation as an electrode sheet constituting each of the positive electrode sheet and the negative electrode sheet, a positive electrode mixture, and a negative electrode mixture, and a detailed description thereof will be omitted from this specification.

In addition, the present invention may provide a battery pack including the cylindrical secondary battery as a unit cell, wherein the battery pack may be used as an energy source of a device, such as an electric vehicle, a hybrid electric vehicle, a plug-in hybrid electric vehicle, an electric bicycle, an electric scooter, a power storage device, or an energy storage system.

Structures of the battery pack and the device are well known in the art to which the present invention pertains, and thus a detailed description thereof will be omitted from this specification.

Hereinafter, the present invention will be described with reference to examples. These examples are provided only for easier understanding of the present invention and should not be construed as limiting the scope of the present invention.

Example 1

A separator substrate having a porosity of 34%, measured using a porosimeter, was prepared as a porous separator substrate including a polyolefin-based polymer material, and a solid content including 100 parts by weight of alumina ($Al_2O_3$) having a BET of 3 $m^2/g$, 1 part by weight of an acrylic-based binder, and 1 part by weight of a dispersant was prepared as an inorganic particle.

30 weight % of the solid content was dissolved in 70 weight % of water to manufacture an inorganic slurry.

One surface of the porous separator substrate was coated with the inorganic slurry such that the inorganic slurry had a thickness of 5 μm to manufacture a single-sided coated aqueous separator having an inorganic layer formed on one surface thereof.

Porosity of the inorganic layer calculated according to the following equation was 56%.

$$(1-(\text{density of inorganic layer/density of solid content})\times100$$

In the above equation, the density of the solid content may be calculated from the sum of densities of individual ingredients constituting the solid content in the state in which a content ratio is reflected therein.

Example 2

A single-sided coated aqueous separator was manufactured using the same method as in Example 1 except that alumina having a BET of 6 $m^2/g$ was used as an inorganic particle, instead of alumina having a BET of 3 $m^2/g$, and porosity of an inorganic layer manufactured with an inorganic slurry including 100 parts by weight of the inorganic particle and 2 parts by weight of a binder was 58%, unlike Example 1.

Example 3

A single-sided coated aqueous separator was manufactured using the same method as in Example 1 except that alumina having a BET of 9 $m^2/g$ was used as an inorganic particle, instead of alumina having a BET of 3 $m^2/g$, and porosity of an inorganic layer manufactured with an inorganic slurry including 100 parts by weight of the inorganic particle and 3 parts by weight of a binder was 57%, unlike Example 1.

Example 4

A single-sided coated aqueous separator was manufactured using the same method as in Example 1 except that boehmite having a BET of 5 $m^2/g$ was used as an inorganic particle, instead of alumina having a BET of 3 $m^2/g$, and porosity of an inorganic layer manufactured with an inorganic slurry including 100 parts by weight of the inorganic particle and 2 parts by weight of a binder was 60%, unlike Example 1.

Example 5

A single-sided coated aqueous separator was manufactured using the same method as in Example 1 except that boehmite having a BET of 15 $m^2/g$ was used as an inorganic particle, instead of alumina having a BET of 3 $m^2/g$, and porosity of an inorganic layer manufactured with an inorganic slurry including 100 parts by weight of the inorganic particle and 6 parts by weight of a binder was 58%, unlike Example 1.

Example 6

A single-sided coated aqueous separator was manufactured using the same method as in Example 1 except that ATH having a BET of 10 $m^2/g$ was used as an inorganic particle, instead of alumina having a BET of 3 $m^2/g$, and porosity of an inorganic layer manufactured with an inorganic slurry including 100 parts by weight of the inorganic particle and 5 parts by weight of a binder was 56%, unlike Example 1.

Example 7

A single-sided coated aqueous separator was manufactured using the same method as in Example 1 except that ATH having a BET of 15 $m^2/g$ was used as an inorganic particle, instead of alumina having a BET of 3 $m^2/g$, and porosity of an inorganic layer manufactured with an inorganic slurry including 100 parts by weight of the inorganic particle and 6 parts by weight of a binder was 55%, unlike Example 1.

Comparative Example 1

A separator substrate having a porosity of 40%, measured using a porosimeter, was prepared as a porous separator substrate including a polyolefin-based polymer material, and a solid content including 100 parts by weight of alumina ($Al_2O_3$) having a BET of 3 $m^2/g$, 1 part by weight of an acrylic-based binder, and 1 part by weight of a dispersant was prepared as an inorganic particle.

19 weight % of the solid content was dissolved in 81 weight % of water to manufacture an inorganic slurry.

One surface of the porous separator substrate was coated with the inorganic slurry such that the inorganic slurry had a thickness of 5 μm to manufacture a single-sided coated aqueous separator having an inorganic layer formed on one surface thereof.

Porosity of the inorganic layer calculated according to the following equation was 47%.

$$(1-(\text{density of inorganic layer/density of solid content})\times 100$$

In the above equation, the density of the solid content may be calculated from the sum of densities of individual ingredients constituting the solid content in the state in which a content ratio is reflected therein.

Comparative Example 2

A single-sided coated aqueous separator was manufactured using the same method as in Comparative Example 1 except that alumina having a BET of 6 m²/g was used as an inorganic particle, instead of alumina having a BET of 3 m²/g, and porosity of an inorganic layer manufactured with an inorganic slurry including 100 parts by weight of the inorganic particle and 2 parts by weight of a binder was 47%, unlike Comparative Example 1.

Comparative Example 3

A single-sided coated aqueous separator was manufactured using the same method as in Comparative Example 1 except that alumina having a BET of 9 m²/g was used as an inorganic particle, instead of alumina having a BET of 3 m²/g, and porosity of an inorganic layer manufactured with an inorganic slurry including 100 parts by weight of the inorganic particle and 5 parts by weight of a binder was 48%, unlike Comparative Example 1.

Comparative Example 4

A single-sided coated aqueous separator was manufactured using the same method as in Comparative Example 1 except that boehmite having a BET of 5 m²/g was used as an inorganic particle, instead of alumina having a BET of 3 m²/g, and porosity of an inorganic layer manufactured with an inorganic slurry including 100 parts by weight of the inorganic particle and 2 parts by weight of a binder was 51%, unlike Comparative Example 1.

Comparative Example 5

A single-sided coated aqueous separator was manufactured using the same method as in Comparative Example 1 except that boehmite having a BET of 15 m²/g was used as an inorganic particle, instead of alumina having a BET of 3 m²/g, and porosity of an inorganic layer manufactured with an inorganic slurry including 100 parts by weight of the inorganic particle and 6 parts by weight of a binder was 49%, unlike Comparative Example 1.

Comparative Example 6

A single-sided coated aqueous separator was manufactured using the same method as in Comparative Example 1 except that ATH having a BET of 10 m²/g was used as an inorganic particle, instead of alumina having a BET of 3 m²/g, and porosity of an inorganic layer manufactured with an inorganic slurry including 100 parts by weight of the inorganic particle and 5 parts by weight of a binder was 47%, unlike Comparative Example 1.

Comparative Example 7

A single-sided coated aqueous separator was manufactured using the same method as in Comparative Example 1 except that ATH having a BET of 15 m²/g was used as an inorganic particle, instead of alumina having a BET of 3 m²/g, and porosity of an inorganic layer manufactured with an inorganic slurry including 100 parts by weight of the inorganic particle and 6 parts by weight of a binder was 46%, unlike Comparative Example 1.

Measurement of Permeability

Permeability means time taken for 100 cc of air to be transmitted through a target to be measured, and uses sec/100 cc as the unit thereof.

In addition, the permeability may be shown as a Gurley value. In this specification, permeability of the entirety of a separator including an inorganic layer was measured according to JIS P8117.

A Seiko R150-02 from Asahi Company was used as a permeability measuring instrument.

The permeability measurement results of the separators according to Examples 1 to 7 and Comparative Examples 1 to 7 and the values calculated according to the above relation are shown in Table 1 and Table 2 below.

TABLE 1

|  | Example 1 | Example 2 | Example 3 | Example 4 | Example 5 | Example 6 | Example 7 |
|---|---|---|---|---|---|---|---|
| Inorganic material | Alumina | Alumina | Alumina | Boehmite | Boehmite | ATH | ATH |
| BET (m²/g) | 3 | 6 | 9 | 5 | 15 | 10 | 15 |
| Coating thickness (μm) | 5 | 5 | 5 | 5 | 5 | 5 | 5 |
| Porosity of separator substrate (%) | 34 | 34 | 34 | 34 | 34 | 34 | 34 |
| Porosity of inorganic layer (%) | 56 | 58 | 57 | 60 | 58 | 56 | 55 |
| Permeability (sec/100 cc) | 180 | 150 | 160 | 150 | 180 | 130 | 120 |
| Left value of relation | 116 | 108 | 112 | 100 | 108 | 116 | 120 |

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Inorganic material | Alumina | Alumina | Alumina | Boehmite | Boehmite | ATH | ATH |
| BET ($m^2$/g) | 3 | 6 | 9 | 5 | 15 | 10 | 15 |
| Coating thickness (μm) | 5 | 5 | 5 | 5 | 5 | 5 | 5 |
| Porosity of separator substrate (%) | 40 | 40 | 40 | 40 | 40 | 40 | 40 |
| Porosity of inorganic layer (%) | 47 | 49 | 48 | 51 | 49 | 47 | 46 |
| Permeability (sec/100 cc) | 180 | 150 | 160 | 150 | 180 | 130 | 120 |
| Left value of relation | 212 | 204 | 208 | 196 | 204 | 212 | 216 |

Referring to Table 1 and Table 2 above, it can be seen that, for the separators according to Examples, the left value of the relation is less than the permeability, and for the separators according to Comparative Examples, the left value of the relation is greater than the permeability.

In order to check impregnability of the separators according to Examples, which satisfied the above relation, and impregnability of the separators according to Comparative Examples, which did not satisfy the above relation, an electrolytic solution drip test was performed as follows.

Immediately after dripping, a capture button was pushed to check the shape of the water drop, and the shape of the water drop was further captured in 5 minutes.

The diffusion distance of the water drop dripped onto the separator was measured in an MD direction and a TD direction.

The diffusion distances of the separators according to Examples 1 to 7 are shown in photographs of FIGS. 1 to 7 and Table 3 below, and the diffusion distances of the separators according to Comparative Examples 1 to 7 are shown in photographs of FIGS. 8 to 14 and Table 4 below.

TABLE 3

| Diffusion distance (mm) | Example 1 | Example 2 | Example 3 | Example 4 | Example 5 | Example 6 | Example 7 |
|---|---|---|---|---|---|---|---|
| MD direction | 3.5 | 3.6 | 3.5 | 3.7 | 3.6 | 3.6 | 3.8 |
| TD direction | 2.2 | 2.1 | 2.1 | 2.4 | 2.2 | 2.0 | 2.0 |

TABLE 4

| Diffusion distance (mm) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| MD direction | 0.7 | 0.6 | 0.6 | 1.3 | 1.4 | 1.2 | 1.2 |
| TD direction | 0.6 | 0.5 | 0.6 | 0.9 | 0.9 | 1.1 | 1.1 |

<Electrolytic Solution Drip Test>

A digital optical microscope (AD7013MZT (R4) from AnMo Electronics Corporation) and a steel ruler were prepared, and the digital optical microscope was focused while the height of the digital optical microscope was adjusted such that the scale bar of the digital optical microscope and the measurement value of the steel ruler coincide with each other.

Each of the separators manufactured according to Examples and Comparative Examples was cut to a size of 50 mm long and 50 mm wide. The cut separator was placed on a slide glass, and adhesive tape was attached to each vertex thereof to fix the separator to the slide glass.

A microsyringe having a capacity of 10 μl was filled with 2 μl of propylene carbonate, and propylene carbonate was dripped onto the fixed separator in the form of a water drop.

Referring to Table 3 and Table 4 above, the diffusion distances of the separators according to Examples were 3.5 mm or more in the MD direction and 2.0 mm or more in the TD direction, whereas the diffusion distances of the separators according to Comparative Examples were 1.4 mm or less in the MD direction and 1.1 mm or less in the TD direction.

Consequently, it can be seen that impregnability of the separators according to Examples, which satisfied the relation, was remarkably improved. Consequently, it can be indirectly seen that, when permeability of a separator is a constant value and porosity of the separator substrate and porosity of the inorganic layer are set so as to satisfy the above relation, the permeability of the separator is remarkably improved.

Those skilled in the art to which the present invention pertains will appreciate that various applications and modifications are possible within the category of the present invention based on the above description.

The invention claimed is:

1. A separator comprising:

a separator substrate comprising a porous material; and an inorganic layer on at least one surface of the separator substrate, wherein each of the separator substrate and the inorganic layer has a porosity satisfying the following relationship:

$$(10 \times \text{porosity of separator substrate}) - (4 \times \text{porosity of inorganic layer}) \leq \text{permeability of separator},$$

wherein the porosity of the inorganic layer is 55% or more, and wherein the inorganic layer comprises inorganic material particles comprising $Al_2O_3$, boehmite, or alumina trihydrate (ATH).

2. The separator according to claim 1, wherein the permeability of the separator is 200 sec/100 cc or less.

3. The separator according to claim 1, wherein the inorganic layer has a thickness equivalent to 30% or more of a total thickness of the separator.

4. The separator according to claim 1, wherein the inorganic layer comprises inorganic material particles having a BET of 3.0 $m^2$/g or more.

5. The separator according to claim 4, wherein the inorganic material particles have a permittivity constant of 1 or more, piezoelectricity, or lithium ion transfer ability.

6. The separator according to claim 1, wherein each of a machine direction and a transverse direction diffusion distances of the separator is 2.0 mm or more.

7. A cylindrical secondary battery having an electrode assembly comprising the separator according to claim 1 received in a cylindrical battery case.

8. A battery pack comprising the cylindrical secondary battery according to claim 7 as a unit cell, wherein the battery pack is used as an energy source of an electric vehicle, a hybrid electric vehicle, a plug-in hybrid electric vehicle, or a power storage device.

* * * * *